US009935683B2

(12) United States Patent
Coomans et al.

(10) Patent No.: US 9,935,683 B2
(45) Date of Patent: Apr. 3, 2018

(54) ORDERLY LEAVING WITHIN A VECTORING GROUP

(71) Applicant: Provenance Asset Group LLC, Essex, CT (US)

(72) Inventors: Werner Coomans, Antwerp (BE); Jochen Maes, Laakdal (BE)

(73) Assignee: Provenance Asset Group LLC, Essex, CT (US)

( * ) Notice: Subject to any disclaimer, the term of this patent is extended or adjusted under 35 U.S.C. 154(b) by 0 days.

(21) Appl. No.: 15/026,025

(22) PCT Filed: Oct. 14, 2014

(86) PCT No.: PCT/EP2014/072018
§ 371 (c)(1),
(2) Date: Mar. 30, 2016

(87) PCT Pub. No.: WO2015/059004
PCT Pub. Date: Apr. 30, 2015

(65) Prior Publication Data
US 2016/0248476 A1    Aug. 25, 2016

(30) Foreign Application Priority Data

Oct. 22, 2013  (EP) .................................... 13306451

(51) Int. Cl.
*H04B 3/32*   (2006.01)
*H04L 12/64*  (2006.01)
(Continued)

(52) U.S. Cl.
CPC .............. *H04B 3/32* (2013.01); *H04B 3/487* (2015.01); *H04L 12/6418* (2013.01); *H04M 11/062* (2013.01)

(58) Field of Classification Search
CPC ... H04B 3/32; H04B 3/46; H04B 1/38; H04B 3/487; H04L 1/20
(Continued)

(56) References Cited

U.S. PATENT DOCUMENTS 5,630,061 A    5/1997  Richter et al.
6,757,744 B1   6/2004  Narisi et al.
(Continued)

FOREIGN PATENT DOCUMENTS

CN    102422588    4/2012
EP    0621713 A2   10/1994
(Continued)

OTHER PUBLICATIONS

"Asynchronous facsimile DCE control—Service Class 2; T.32 (08/95)", ITU-T Standard in Force (I), International Telecommunication Union, Geneva, CH, No. T. 32 (8/95). Aug. 11, 1995, XP017403455, Sections 8.3.5, 8.4.5, 8.5.1.7, 8.5.2.9., pp. 82.
(Continued)

*Primary Examiner* — Emmanuel Bayard
(74) *Attorney, Agent, or Firm* — Dinsmore & Shohl LLP

(57) ABSTRACT

In accordance with an embodiment of the invention, the method includes detecting a leaving event such that a communication path established between two peer transceivers coupled to the particular subscriber line is to be orderly discontinued. The method further includes, during a pre-disconnection phase following the detection of the leaving event, switching the two peer transceivers into respective OFF power states during first symbol positions and into respective ON power states during second remaining symbol positions, characterizing crosstalk within the vectoring group during the first symbol positions while the second symbol positions are used for regular data communication if any, and definitively switching the two peer transceivers into
(Continued)

the respective OFF power states after the crosstalk characterization completes.

20 Claims, 4 Drawing Sheets

(51) Int. Cl.
*H04M 11/06* (2006.01)
*H04B 3/487* (2015.01)

(58) Field of Classification Search
USPC .................. 375/219–222, 257, 354–357
See application file for complete search history.

(56) References Cited

U.S. PATENT DOCUMENTS

| | | |
|---|---|---|
| 6,810,431 B1 | 10/2004 | Narisi et al. |
| 2002/0053923 A1* | 5/2002 | Kim ................ H03K 19/0005 326/30 |
| 2008/0146290 A1* | 6/2008 | Sreeram ............. H04M 1/6066 455/569.1 |
| 2009/0041103 A1* | 2/2009 | Shi ........................ H04B 3/32 375/222 |
| 2009/0304056 A1* | 12/2009 | De Lind Van Wijngaarden ........... H04B 3/46 375/222 |
| 2010/0234035 A1* | 9/2010 | Fujishima .............. H04L 5/001 455/450 |
| 2010/0278222 A1* | 11/2010 | De Lind Van Wijngaarden ........ H04M 11/062 375/220 |
| 2012/0306283 A1* | 12/2012 | Kim ....................... H02J 17/00 307/104 |
| 2012/0320959 A1* | 12/2012 | Lu .......................... H04B 3/32 375/224 |
| 2014/0359102 A1* | 12/2014 | Kihara ................. H04L 63/107 709/223 |
| 2015/0326380 A1* | 11/2015 | Verbin ................. H04L 5/1438 370/252 |
| 2016/0080031 A1* | 3/2016 | Kassel ................ H04M 11/062 379/406.06 |

FOREIGN PATENT DOCUMENTS

| | | |
|---|---|---|
| KR | 2002-0021450 A | 3/2002 |
| KR | 2012-0003930 A | 1/2012 |

OTHER PUBLICATIONS

International Search Report PCT/ISA/210 for International Application No. PCT/EP2014/072018 dated Jan. 23, 2015.
Written Opinion of the International Searching Authority PCT/ISA/237 for International Application No. PCT/EP2014/072018 dated Jan. 23, 2015.

* cited by examiner

ORDERLY LEAVING WITHIN A VECTORING GROUP

CROSS-REFERENCE TO RELATED APPLICATIONS

This is a National Phase of PCT Patent Application No. PCT/EP2014/072018 filed on Oct. 14, 2014, and claims priority to, European Application No. 13306451.9, filed Oct. 22, 2013, the contents of each of which are hereby incorporated by reference in their entirety.

TECHNICAL FIELD OF THE INVENTION

The present invention relates to a method for discontinuing communications over communication lines of a vectoring group, and related apparatus.

TECHNICAL BACKGROUND OF THE INVENTION

Crosstalk (or inter-channel interference) is a major source of channel impairment for Multiple Input Multiple Output (MIMO) wired communication systems, such as Digital Subscriber Line (DSL) communication systems.

As the demand for higher data rates increases, DSL systems are evolving toward higher frequency bands, wherein crosstalk between neighboring transmission lines (that is to say transmission lines that are in close vicinity over part or whole of their length, such as twisted copper pairs in a cable binder) is more pronounced (the higher frequency, the more coupling).

Different strategies have been developed to mitigate crosstalk and to maximize effective throughput, reach and line stability. These techniques are gradually evolving from static or dynamic spectral management techniques to multi-user signal coordination (or vectoring).

One technique for reducing inter-channel interference is joint signal precoding: the transmit data symbols are jointly passed through a precoder before being transmitted over the respective communication channels. The precoder is such that the concatenation of the precoder and the communication channels results in little or no inter-channel interference at the receivers.

A further technique for reducing inter-channel interference is joint signal post-processing: the received data symbols are jointly passed through a postcoder before being detected. The postcoder is such that the concatenation of the communication channels and the postcoder results in little or no inter-channel interference at the receivers.

The choice of the vectoring group, that is to say the set of communication lines, the signals of which are jointly processed, is rather critical for achieving good crosstalk mitigation performances. Within a vectoring group, each communication line is considered as a disturber line inducing crosstalk into the other communication lines of the group, and the same communication line is considered as a victim line receiving crosstalk from the other communication lines of the group. Crosstalk from lines that do not belong to the vectoring group is treated as alien noise and is not canceled.

Ideally, the vectoring group should match the whole set of communication lines that physically and noticeably interact with each other. Yet, local loop unbundling (imposed by national regulation policies) and/or limited vectoring capabilities may prevent such an exhaustive approach, in which case the vectoring group would include a sub-set only of all the physically interacting lines, thereby yielding limited vectoring gains.

Signal vectoring is typically performed within an access node, wherein all the data symbols concurrently transmitted over, or received from, all the communication lines of the vectoring group are available. For instance, signal vectoring is advantageously performed within a Digital Subscriber Line Access Multiplexer (DSLAM) deployed at a Central office (CO) or as a fiber-fed remote unit closer to subscriber premises (street cabinet, pole cabinet, building cabinet, etc). Signal precoding is particularly appropriate for downstream communication (toward customer premises), while signal post-processing is particularly appropriate for upstream communication (from customer premises).

Linear signal precoding and post-processing are advantageously implemented by means of matrix products.

For instance, a linear precoder performs a matrix-product of a vector of transmit frequency samples with a precoding matrix, the precoding matrix being such that the overall channel matrix is diagonalized, meaning the off-diagonal coefficients of the overall channel, and thus the inter-channel interference, mostly reduce to zero. Practically, and as a first-order approximation, the precoder superimposes anti-phase crosstalk pre-compensation signals over the victim line along with the direct signal that destructively interfere at the receiver with the actual crosstalk signals from the respective disturber lines.

Similarly, a linear postcoder performs a matrix-product of a vector of received frequency samples with a crosstalk cancellation matrix, the crosstalk cancellation matrix being such that the overall channel matrix is diagonalized too.

It is of utmost importance thus to get an accurate and up-to-date estimate of the respective crosstalk couplings in order to properly mitigate the actual crosstalk.

In the recommendation entitled "*Self-FEXT Cancellation (Vectoring) For Use with VDSL2 Transceivers*", ref. G.993.5, and adopted by the International Telecommunication Union (ITU) on April 2010, the transceivers are configured to send downstream and upstream pilot sequences over the so-called SYNC symbols, which occur periodically after every 256 DATA symbols. On a given victim line, error samples, which comprise both the real and imaginary part of the slicer error (or receive error vector) as measured for a specific SYNC symbol on a per tone or group-of-tones basis, are reported to a vectoring controller for further crosstalk estimation. The error samples are correlated with a given pilot sequence transmitted over a given disturber line in order to obtain the crosstalk coefficient from that disturber line. To reject the crosstalk contribution from the other disturber lines, the pilot sequences are made orthogonal to each other, for instance by using Walsh-Hadamard sequences comprising '+1' and '−1' anti-phase symbols. The crosstalk estimates are used for initializing or updating the coefficients of the precoding matrix or of the crosstalk cancellation matrix.

Orthogonal pilot sequences as per G.993.5 recommendation are very effective and always produce accurate and unbiased estimates of the crosstalk channels (initialization) or of the residual crosstalk channels (tracking). Yet, with the use of even broader transmit spectrum for next generation copper-access, second-order effects starts arising.

For instance, when a line of a vectoring group shuts down and corresponding transceivers disconnect from the transmission medium, the impedance change over the discontinued line induces a notable change in the crosstalk channels between the other still-active lines of the vectoring group.

Indeed, with the increased carrier frequency, second-order crosstalk, i.e. crosstalk from a disturber line into the discontinued line and then back into another victim line, is no longer negligible. As the impedance changes on the discontinued line from a nominal low-value (typically one hundreds ohms) to a high value (typically a few thousands ohms up to the open circuit impedance), the crosstalk couplings into and from the discontinued line are altered, thereby yielding some residual crosstalk on the other still-active lines of the vectoring group. Thus, a new crosstalk acquisition round, which lasts several super frames, needs to take place after one or more lines are discontinued in order to characterize the new residual crosstalk channels. Meanwhile, communication over the other still-active lines is severely impaired by this residual crosstalk, which may affect the user experience and even lead to line retrains.

SUMMARY OF THE INVENTION

It is an object of the present invention to improve orderly leaving of a communication line in a vectoring group.

In accordance with a first aspect of the invention, a method for discontinuing communication over a particular communication line forming part of a vectoring group comprises detecting a leaving event whereby a communication path established between two peer transceivers coupled to the particular subscriber line is to be orderly discontinued. The method further comprises, during a pre-disconnection phase following the detection of the leaving event, switching the two peer transceivers into respective OFF power states during first symbol positions and into respective ON power states during second remaining symbol positions, characterizing crosstalk within the vectoring group during the first symbol positions while the second symbol positions are used for regular data communication if any, and definitively switching the two peer transceivers into the respective OFF power states after the crosstalk characterization completes.

In one embodiment of the invention, the ON power state of a transceiver is characterized by transmit and receive paths of the transceiver being powered and by a nominal load impedance value close to a characteristic impedance of a transmission medium, and the OFF power state of the transceiver is characterized by selected or all active components of the transceiver being switched OFF and by a further load impedance value.

In one embodiment of the invention, the further load impedance value is different from the nominal load impedance value for at least one of the two peer transceivers.

In one embodiment of the invention, the method further comprises configuring a vectoring processor for mitigating crosstalk within the vectoring group based on the so-characterized crosstalk and concomitantly with the two peer transceivers definitively switching into the respective OFF power states.

In one embodiment of the invention, the step of characterizing crosstalk within the vectoring group comprises transmitting a sequence of crosstalk probing symbols over a disturber line of the vectoring group during the first symbol positions, measuring crosstalk interference on a victim line of the vectoring group while the crosstalk probing symbols are being transmitted, and characterizing a crosstalk channel from the disturber line into the victim line based on the measured crosstalk interference.

In one embodiment of the invention, the detected leaving event is a pre-disconnection message issued by one of the two peer transceivers whereby preliminary steps are to be taken before the communication path is effectively torn down.

In accordance with another aspect of the invention, a transceiver for operating a communication path with a peer transceiver over a particular communication line of a vectoring group, is configured, during a pre-disconnection phase following the detection of a leaving event whereby the communication path is to be orderly discontinued, to switch into an OFF power state during first symbol positions and into an ON power state during second remaining symbol positions. The first symbol positions are used for crosstalk characterization within the vectoring group, and the second symbol positions are used for regular data communication if any. The transceiver is further configured to definitively switch into the OFF power state after the crosstalk characterization completes.

Further characterizing embodiments of the transceiver are mentioned in the appended claims.

Such a transceiver may form part of an access node that supports wired communication services with subscriber devices over an access plant, such as a DSLAM, an Ethernet switch, an edge router, etc, and deployed at a CO or as a fiber-fed remote unit closer to subscriber premises (street cabinet, pole cabinet, building cabinet, etc).

Such a transceiver may alternatively form part of a Customer Premises Equipment (CPE) for that supports wired communication services with an access node over a subscriber loop, such as a DSL gateway, a DSL router, etc.

The basic idea is to configure the peer transceivers to switch their impedance during specific symbol positions. During a so-called pre-disconnection phase preceding the actual transceiver disconnection, the two peer transceivers keep their ON impedance value (a nominal impedance value close to the characteristic impedance of the transmission medium) during normal DATA symbols, thereby not impairing data communication over the other still-active lines of the vectoring group, yet switch to their respective OFF impedance value (typically a high impedance value compared to the nominal impedance value) during SYNC symbols only so as to allow the vectoring controller to properly estimate the new coming crosstalk environment.

Once the crosstalk characterization completes, both transceivers switch to their OFF impedance value from a given symbol onwards and for all subsequent symbols (both DATA and SYNC symbols). The vectoring controller makes sure that the vectoring processor is configured with the new crosstalk estimates from that given symbol onwards such that the residual crosstalk caused by the impedance change over the discontinued line is properly mitigated over the active lines without any transient impairment.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
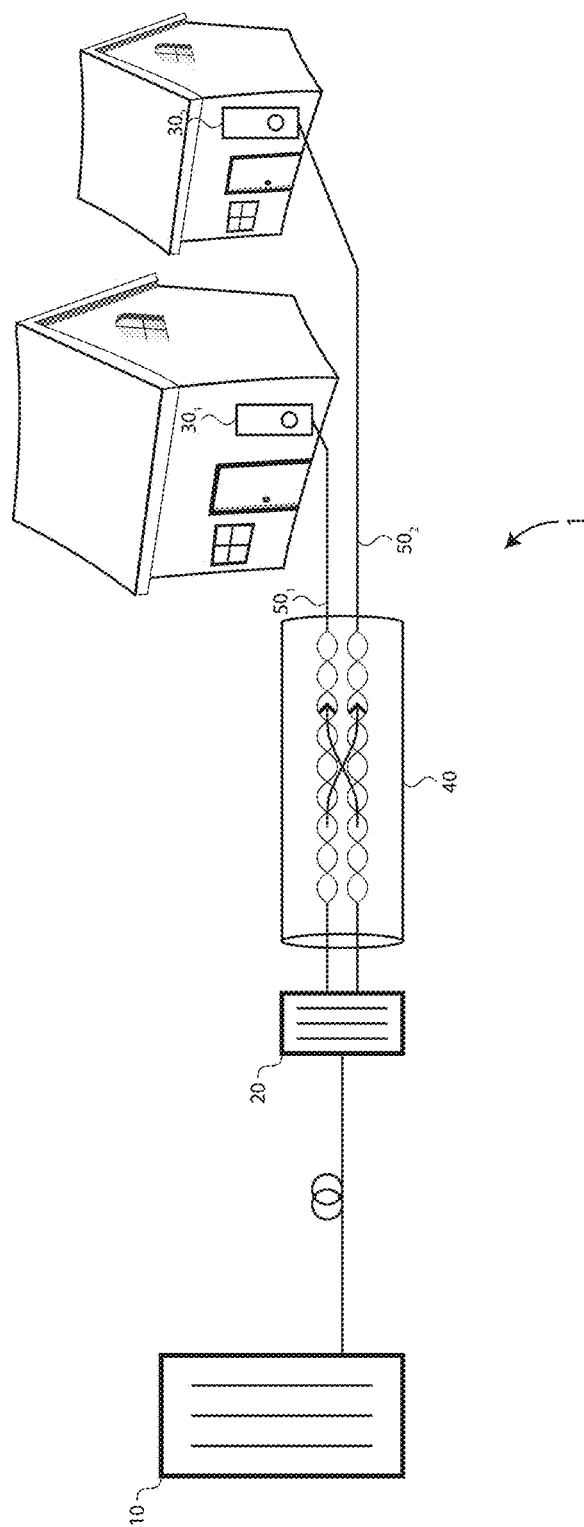
FIG. 1 represents an overview of an access plant.

There is seen in FIG. 1 an access plant 1 comprising a network unit 10 at a CO, a remotely-deployed access node 20 coupled via one or more optical fibers to the network unit 10, and further coupled via a copper loop plant to Customer Premises Equipment (CPE) 30 at various subscriber premises.

The copper loop plant comprises a common access segment 40, wherein the subscriber lines are in close vicinity with each other and thus induce crosstalk into each other, and dedicated loop segments 50 with weak interactions for final connection to the subscriber premises. The transmission medium is typically composed of copper Unshielded Twisted Pairs (UTP).

The access node 20 comprises a vectoring processor for jointly processing the data symbols that are being transmitted over, or received from, the loop plant in order to mitigate the crosstalk induced within the common access segment 40 and to increase the communication data rates achievable over the respective subscriber lines.

Figure 2:
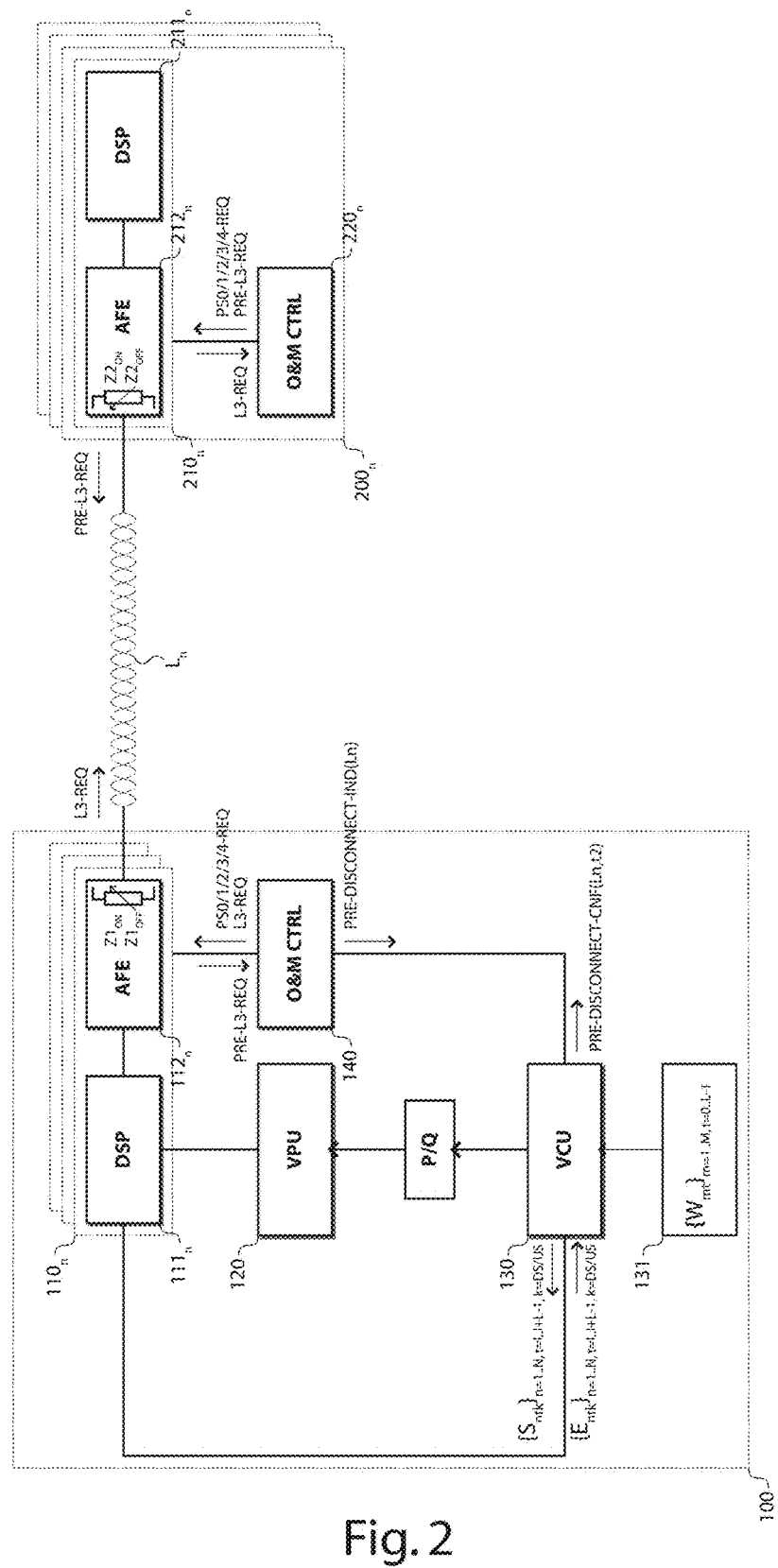
FIG. 2 represents an access node and respective CPEs as per the present invention.

There is seen in FIG. 2 an access node 100 as per the present invention coupled to N CPEs $200_1$ to $200_N$ as per the present invention through N respective transmission lines $L_1$ to $L_N$, which are assumed to form part of the same vectoring group.

The access node 100 comprises:
N DSL transceivers $110_1$ to $110_N$;
a Vectoring Processing Unit 120 (or VPU);
a Vectoring Control Unit 130 (or VCU) for controlling the operation of the VPU 120; and
an Operation and Maintenance (O&M) controller 140.

The transceivers 110 are individually coupled to the VPU 120, to the VCU 130 and to the O&M controller 140. The VCU 130 is further coupled to the VPU 120. The O&M controller 140 is further coupled to the VCU 130.

The transceivers 110 respectively comprise:
a Digital Signal Processor (DSP) 111; and
an Analog Front End (AFE) 112.

The CPEs 200 respectively comprise:
a DSL transceiver 210; and
an O&M controller 220.

The transceivers 210 is coupled to the O&M controller 220.

The DSL transceivers 210 respectively comprise:
a Digital Signal Processor (DSP) 211; and
an Analog Front End (AFE) 212.

The AFEs 112 and 212 respectively comprise a Digital-to-Analog Converter (DAC) and an Analog-to-Digital Converter (ADC), a transmit filter and a receive filter for confining the signal energy within the appropriate communication frequency bands while rejecting out-of-band interference, a line driver for amplifying the transmit signal and for driving the transmission line, and a Low Noise Amplifier (LNA) for amplifying the receive signal with as little noise as possible.

The AFEs 112 and 212 further comprise a hybrid for coupling the transmitter output to the transmission line and the transmission line to the receiver input while achieving low transmitter-receiver coupling ratio, impedance-matching circuitry for adapting to the characteristic impedance of the transmission line, and isolation circuitry (typically a transformer). In case of Time Duplexing Division (TDD) operation, the hybrid can be advantageously omitted as the transmitter and receiver operate in alternate mode: the receive circuitry is switched OFF (or the receive signal is discarded) while the transmit circuitry is active, and the other way around, the transmit circuitry is switched OFF while the receive circuitry is active.

The DSPs 111 and 211 are respectively configured to operate downstream and upstream DSL communication channels.

The DSPs 111 and 211 are further configured to operate downstream and upstream DSL control channels that are used to transport DSL control traffic, such as diagnosis or management commands and responses. Control traffic is multiplexed with user traffic over the DSL channel.

More specifically, the DSPs 111 and 211 are for encoding and modulating user and control data into digital data symbols, and for de-modulating and decoding user and control data from digital data symbols.

The following transmit steps are typically performed within the DSPs 111 and 211:
data encoding, such as data multiplexing, framing, scrambling, error control encoding, and data interleaving;
signal modulation, comprising the steps of ordering the carriers according to a carrier ordering table, parsing the encoded bit stream according to the respective bit loadings of the ordered carriers, and mapping each chunk of bits onto an appropriate transmit constellation point (with respective carrier amplitude and phase), possibly using Trellis Coded Modulation (TCM);
signal scaling;
Inverse Fast Fourier Transform (IFFT);
Cyclic Extension (CE) insertion; and possibly
time-windowing.

The following receive steps are typically performed within the DSPs 111 and 211:
CE removal, and possibly time-windowing;
Fast Fourier Transform (FFT);
Frequency EQualization (FEQ);
signal de-modulation and detection, comprising the steps of applying to each and every equalized frequency sample an appropriate constellation grid, the pattern of which depends on the respective carrier bit loading, detecting the expected transmit constellation point and the corresponding transmit bit sequence, possibly with TCM decoding, and re-ordering all the detected chunks of bits according to the carrier ordering table; and
data decoding, such as data de-interleaving, error detection and/or correction, de-scrambling, frame delineation and de-multiplexing.

The DSPs 111 are further configured to supply transmit frequency samples to the VPU 120 before Inverse Fast Fourier Transform (IFFT) step for joint signal precoding, and to supply receive frequency samples to the VPU 120 after Fast Fourier Transform (FFT) step for joint signal post-processing.

The DSPs 111 are further configured to receive corrected frequency samples from the VPU 120 for further transmission or detection. Alternatively, the DSPs 111 may receive correction samples to add to the initial frequency samples before further transmission or detection.

The VPU 120 is configured to mitigate the crosstalk induced over the transmission lines. This is achieved by multiplying a vector of transmit frequency samples with a precoding matrix P so as to pre-compensate an estimate of the expected crosstalk (downstream), or by multiplying a vector of received frequency samples with a crosstalk cancellation matrix Q so as to post-compensate an estimate of the incurred crosstalk (upstream).

In the matrix P or Q, a row n represents a particular victim line $L_n$, while a column m represents a particular disturber line $L_m$. At the intersection, the coupling coefficient that should be applied to the corresponding disturber transmit or receive frequency sample for mitigating over the victim line $L_n$ the crosstalk from the disturber line $L_m$. Not all the coefficients of the matrix need to be determined, for instance on account of limited vectoring capabilities first assigned to the strongest crosstalkers, or still for instance due to the fact that some lines do not noticeably interact with each other. The undetermined coefficients are preferably set to 0.

Also, it is noteworthy that a communication line $L_n$ for which vectoring operation is not supported or not enabled, such as a legacy line, yet that still noticeably interferes with other communication lines, is only considered as a disturber line within the vectoring group. The off-diagonal coefficients of the corresponding $n^{th}$ row of the matrix P or Q are thus all set to 0.

The VCU 130 is basically for controlling the operation of the VPU 120, and more specifically for estimating the crosstalk coefficients between the transmission lines of the vectoring group, and for initializing and updating the coefficients of the precoding matrix P and of the crosstalk cancellation matrix Q from the so-estimated crosstalk coefficients.

The VCU 130 is further for controlling the vectoring operation of the transceivers 110 and 210 by appropriately configuring and adjusting the vectoring parameters.

The VCU 130 starts first by configuring the respective downstream pilot sequences for use by the transceivers 110 for modulation of the downstream SYNC symbols, and the upstream pilot sequences for use by the transceivers 210 for modulation of the upstream SYNC symbols. The pilot sequences assigned to the transmission lines $L_1$ to $L_N$ are denoted as $\{S_{ntk}\}_{n=1..N, t=1..l+L-1, k=DS/US}$, wherein n denotes a line index ranging from 1 to N, wherein t denotes a SYNC symbol index ranging from 1 up to l+L−1, 1 denoting an arbitrary symbol index for the start of the crosstalk acquisition cycle and L denoting the length of the pilot sequence, and wherein k denotes a frequency or carrier index, DS/US denoting the set of carrier indexes used for downstream/upstream communication respectively (with TDD communication, downstream and upstream communications typically share the same set of carriers). Presently, a common pilot sequence is assumed to be used for both upstream and downstream communication, as well as across all the carriers.

The pilot sequences $\{S_{ntk}\}_{n=1..N, t=1..l+L-1, k=DS/US}$ are chosen from a set 131 of mutually orthogonal pilot sequences $\{W_{mt}\}_{m=1..M, t=0..L-1}$, wherein m denotes a sequence index, and M denotes the size of the set 131. In order to fulfill the orthogonality requirement, the size M of the set of mutually orthogonal pilot sequences 131 shall be greater than or equal to the number N of vectored lines, and less than or equal to the length L of the pilot sequences.

The VCU 130 gathers respective slicer errors $\{E_{ntk}\}_{n=1..N, t=1..l+L-1, k=DS/US}$ as measured during the detection of the SYNC symbols by the remote transceivers 210 for downstream communication, and by the local transceivers 110 for upstream communication.

The VCU 130 correlates the error samples $\{E_{ntk}\}_{n, t=1..l+L-1, k=DS/US}$ on a respective victim line $L_n$ with the pilot sequence $\{S_{mtk}\}_{m, t=1..l+L-1, k=DS/US}$ transmitted over a respective disturber line $L_m$ in order to estimate the crosstalk or residual crosstalk coefficient from the disturber line $L_m$ into the victim line $L_n$.

The new crosstalk or residual crosstalk estimates are then used for initializing or updating the coefficients of the precoding matrix P and of the crosstalk cancellation matrix Q.

The O&M controllers 140 and 220 are configured to control the power state of the transceivers 110 and 210 respectively based on the operational status of the corresponding DSL communication path.

Typically, a DSL communication path is discontinued and goes into L3 state on account of a remote CPE being shut down, or of a subscriber line being disconnected or defective, or of an excessive measured error rate, or of a maintenance command issued by a local or remote operator for disconnecting the DSL communication path in a controlled way, or of a maintenance command for disabling or rebooting a piece of hardware supporting the DSL communication path, such as a Line termination (LT) card, the whole access node 100, etc.

The O&M controllers 140 and 220 are able to configure the transceivers 110 and 210 respectively into three power states, namely PS0, PS1 and PS2.

PS0 power state is the power state wherein the transmit and receive paths are powered and operational so as communication signals can be transmitted and received, and is the default power state when the line is in showtime; PS2 power state is the power state wherein selected or all active components of the AFE and/or selected or all functions of the DSP are permanently shut down, and is the default power state when the line is down. PS1 power state is a mixed state wherein PS2 power state is enforced only during specific symbol positions, presently during SYNC symbols only, while PS0 power state is enforced for the remaining symbol positions, presently during regular DATA symbols.

The exact implementation of PS2 power state depends on the specific hardware implementation of the transceiver, and on whether the transceiver operates at network or subscriber side (xTU-O versus xTU-R).

For instance, in the access node 100, the line driver and the DAC within the AFE 112 can be shut down to achieve some substantial power savings. The DSP 111 may further suspend all of the aforementioned transmit steps so as to save even more power. The receive path within the AFE 112 and the receive operation of the DSP 111 are kept operational so as to listen to any handshake signal that may be received from the remote CPEs 200.

Still for instance, in the CPEs 200, the whole transceiver 210 (including the DSP 211 and the AFE 212) is shut down if DSL communication is no longer required, e.g. when the CPE shuts down, or when the DSL communication path is disabled through some local interface. Yet, upon detection of an external failure, such as Loss of Signal (LoS), the CPE 200 is expected to keep its transmit and receive operation alive, meaning to stay in PS0 power state, so as to keep on trying to initialize the DSL communication path by periodically issuing a handshake signal and by listening to any response from the access node 100.

As a consequence of these active components being switched OFF and ON, the load impedance as seen from the transmission line may vary between a first value $Z_{ON}$ in PS0 power state, which is expected to match the characteristic impedance of the transmission medium (typically, 100Ω for UTP), and a second value $Z_{OFF}$ in PS2 power state. The second value $Z_{OFF}$ is not necessarily different from the first value $Z_{ON}$ for both peer transceivers 110 and 210, but is different from the first value $Z_{ON}$ for at least one of them (typically in the range of a few kΩ). Also, the transceivers 210 may have different $Z_{OFF}$ impedance values on account of the various hardware implementations. Let us denote $Z1_{ON}$ and $Z1_{OFF}$ the impedance load values for the transceivers 110 when they are in PS0 and PS2 power states respectively; and let us denote $Z2_{ON}$ and $Z2_{OFF}$ the impedance load values for the transceivers 210 when they are in PS0 and PS2 power states respectively (assumed equal across all the transceivers 210).

The O&M controllers 140 and 220 communicate with each other through the respective communication lines so as to coordinate their respective actions whenever a disorderly leaving is requested by one of the two ends.

Typically, the O&M controller that initiates the orderly leaving, presently the O&M controller 220, issues a PRE-L3-REQ message through the communication line $L_n$ towards the remote O&M controller, presently the O&M controller 140, to trigger the entry into the pre-disconnection phase. This message is either acknowledged or rejected by the remote transceiver.

Upon rejection of the PRE-L3-REQ message, the peer transceivers are expected to immediately enter the L3 state without transitioning through the pre-disconnection phase.

Upon acknowledgment of the PRE-L3-REQ message, the O&M controllers 140 and 220 instruct their respective transceivers 110 and 210 to switch into mixed power state PS1 (see PS1-REQ message in FIG. 2), thereby yielding $Z1_{OFF}$ and $Z2_{OFF}$ as impedance loads at respective ends of the transmission line during SYNC symbols only, while keeping the nominal impedance $Z1_{ON}$ and $Z2_{ON}$ during regular DATA symbols. The entry into PS1 power state is time-coordinated between the peer transceivers 110 and 210, and starts from a given symbol index t1 onwards.

The O&M controller 140 is further configured to notify the VCU 130 about a line entering into the pre-disconnection phase (see PRE-DISCONNECT-IND($L_n$) message in FIG. 2). The VCU 140 stops any on-going crosstalk acquisition, and starts a new crosstalk acquisition round over some or all of the other still-active lines of the vectoring group so as to characterize the new crosstalk environment. The O&M controller 140 may further seek the approval from the VCU 130 before acknowledging the PRE-L3-REQ message, for instance to determine whether the VCU 130 is available for crosstalk characterization.

The VCU 130 notifies the O&M controller 140 once the crosstalk acquisition round completes and corresponding crosstalk estimates are available (see PRE-DISCONNECT-CNF($L_n$,t2) message in FIG. 2). The VCU 130 derives new coefficients of the precoding matrix P and of the crosstalk cancellation matrix Q from the new crosstalk estimates. The new coefficients will be enforced from a particular symbol position t2 onwards. The scheduled symbol position t2 is notified to the O&M controller 140.

Thereupon, the O&M controller 140 notifies the O&M controller 220 about the end of the pre-disconnection phase by issuing a L3-REQ message through the communication line $L_n$. The L3-REQ message is timely issued such that both transceivers definitively switch into PS2 state (see PS2-REQ message in FIG. 2) at or nearby the symbol index t2 scheduled by the VCU 130, thereby yielding $Z1_{OFF}$ and $Z2_{OFF}$ as impedance loads at respective ends of the transmission line.

Alternatively, the scheduled symbol index t2 can be encoded into the L3-REQ message so as both transceivers switch into PS2 power state at the exact scheduled time.

The duration of the pre-disconnection phase can be upper bounded so as the transceivers transition autonomously to L3 state upon expiry of a corresponding timer, and irrespective of whether crosstalk characterization completes or not.

During line initialization, a similar procedure applies so as to not disturb the already-active lines on account of the impedance change on the joining line. During O-P-VECTOR1/R-P-VECTOR1 initialization phase that follows the handshake phase, the joining line enters another mixed power state PS4, wherein PS0 power state is enforced only during specific symbol positions, such as during SYNC symbols only, while PS2 power state is enforced for the remaining symbol positions, such as during regular DATA symbols. Somehow, PS4 power state is a 'negative' of PS1 power state.

The VCU 130 then learns the crosstalk coefficients from the joining line into the already-active lines. Once the crosstalk from the joining line has been characterized and the precoder has been configured accordingly, the transceivers can switch into PS0 power state and proceed with further initialization steps. In this way, the active lines are not impaired by the impedance change over the joining line during regular data communication.

It is to be noticed that, although depicted as separate functional entities in FIG. 2, the O&M controllers 140 and 220 can be partly or wholly integrated into the respective transceivers 110 and 210.

Figure 3:
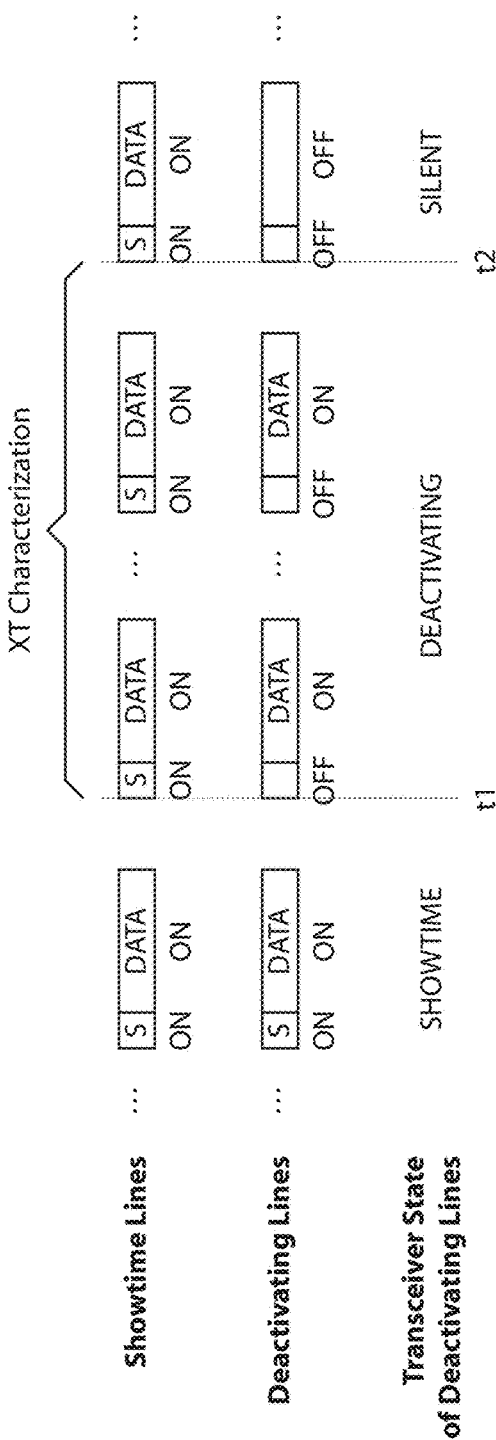
FIG. 3 represents the transceiver states during an orderly leaving.

There is seen in FIG. 3 the respective states of the transceivers during an orderly leaving as per the present invention.

When all the lines are in showtime, the transceivers are in PS0 power state (ON) during both SYNC (S) and DATA symbol periods. Upon request for an orderly leaving, the corresponding transceivers concomitantly switch into PS1 power state (DEACTIVATING) from a certain symbol index t1, meaning that the deactivating transceivers are in PS2 power state (OFF) during SYNC symbols and in PS0 power state (ON) during regular DATA symbols. Meanwhile, the transceivers of the still-active lines remain in PS0 default power state. Once the characterization of the new crosstalk environment completes, the transceivers definitively switch into PS2 power state (SILENT) from another given symbol index t2, and concomitantly with the new configuration of the vectoring processor. The power state switching is scheduled during the CE of the respective symbols, and preferably during the windowing interval, which is the symbol transition period between two adjacent symbols. Indeed, a typical time needed to switch ON or OFF a line driver is of the order of 200 ns, which should be sufficient to make it fit within the CE.

Figure 4A:
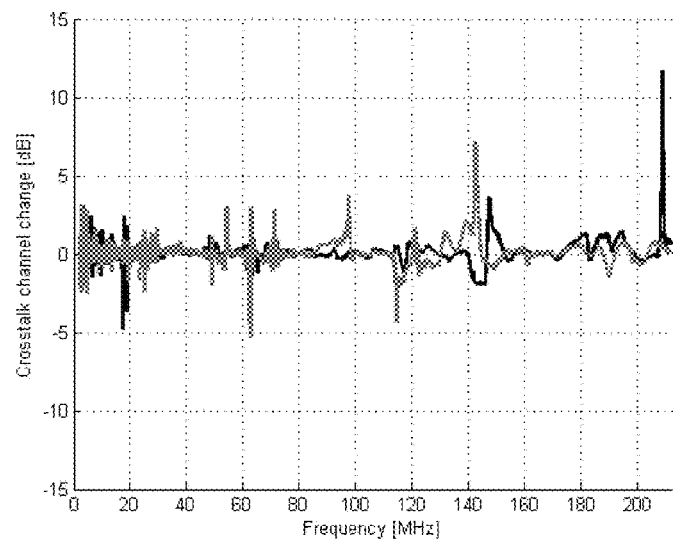
FIG. 4A is a plot of the relative change in crosstalk amplitude versus frequency when a line is discontinued.

There is seen in FIG. 4A a plot of the relative change in crosstalk amplitudes on two active lines of a vectoring group, presently lines L1 and L2, when another line of the vectoring group is discontinued, presently line L3. The discontinuation of line L3 is emulated by switching one of the two load impedances of the line L3 from $Z_{ON}$ to $Z_{OFF}$. If the two load impedances are changed to $Z_{OFF}$, then the changes are even more drastic.

The plot shows a crosstalk amplitude change of a couple dB well above 10 dB. The impact is largest near the sharp crosstalk dips, since a slight shift in the dip frequency introduce large differences in crosstalk amplitude for frequencies near the dip.

It is to be noted that the impedance change on line L3 also induces changes in the direct channels. These changes are much smaller in amplitude than the changes induced in the crosstalk channels, but they have a different impact.

Figure 4B:
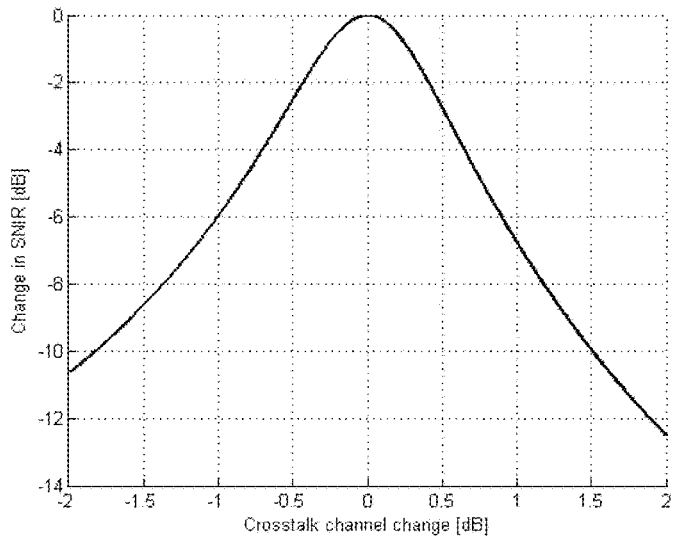
FIG. 4B is a plot of the change in Signal to Noise plus Interference ratio (SNIR) versus the crosstalk amplitude change.

There is seen in FIG. 4B the change in SNIR versus the relative change in crosstalk channel amplitude as depicted in FIG. 4A. For this plot, the transmit power is assumed to be equal to −76 dBm/Hz, the noise floor to −140 dBm/Hz, and the nominal crosstalk channel amplitude (before the impedance change) to −40 dB.

As one can see, a change of 1 dB in the crosstalk channel amplitude causes a change of 6 DB in SNIR, which is the typical value configured for the noise margin. From that threshold on, the encoded bit stream starts being severely corrupted.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A method for discontinuing communication over a particular communication line forming part of a vectoring group, the method comprising:
   detecting a leaving event whereby a communication path established between two peer transceivers coupled to the particular communication line is to be orderly discontinued;
   during a pre-disconnection phase following the detection of the leaving event,
   switching the two peer transceivers into respective OFF power states during first symbol positions and into respective ON power states during remaining second symbol positions, and
   characterizing crosstalk within the vectoring group during the first symbol positions while the second symbol positions are used for regular data communication; and
   definitively switching the two peer transceivers into the respective OFF power states after the crosstalk characterization completes.

2. The method according to claim 1, wherein
   the ON power state of a transceiver is characterized by transmit and receive paths of the transceiver being powered and by a nominal load impedance value close to a characteristic impedance of a transmission medium, and
   the OFF power state of the transceiver is characterized by selected or all active components of the transceiver being switched OFF and by a further load impedance value.

3. The method according to claim 2, wherein the further load impedance value is different from the nominal load impedance value for at least one of the two peer transceivers.

4. The method according to claim 1, further comprising:
   configuring a vectoring processor for mitigating crosstalk within the vectoring group based on the characterized crosstalk and concomitantly with the two peer transceivers definitively switching into the respective OFF power states.

5. The method according to claim 1, wherein the characterizing crosstalk within the vectoring group includes,
   transmitting a sequence of crosstalk probing symbols over a disturber line of the vectoring group during the first symbol positions;
   measuring crosstalk interference on a victim line of the vectoring group while the crosstalk probing symbols are being transmitted during the first symbol positions; and
   characterizing a crosstalk channel from the disturber line into the victim line based on the measured crosstalk interference.

6. The method according to claim 1, wherein the detected leaving event is a pre-disconnection message issued by one of the two peer transceivers whereby preliminary steps are to be taken before the communication path is effectively disconnected.

7. The method according to claim 1, wherein the first symbol positions are interleaved with the second symbol positions.

8. The method according to claim 1, wherein the leaving event is not performed until the pre-disconnection phase is completed.

9. The method according to claim 1, wherein the characterizing crosstalk further includes,
   characterizing crosstalk of all active communication lines of the vectoring group.

10. A transceiver for operating a communication path with a peer transceiver over a particular communication line of a vectoring group, comprising:
    a processor configured to, switch, during a pre-disconnection phase following detection of a leaving event whereby the communication path is to be orderly discontinued, into an OFF power state during first symbol positions and into an ON power state during remaining second symbol positions, the first symbol positions being used for crosstalk characterization within the vectoring group, and the second symbol positions being used for regular data communication; and definitively switch into the OFF power state after the crosstalk characterization completes.

11. The transceiver according to claim 10, wherein
the ON power state of the transceiver is characterized by transmit and receive paths of the transceiver being powered and by a nominal load impedance value close to a characteristic impedance of a transmission medium, and
the OFF power state of the transceiver is characterized by selected or all active components of the transceiver being switched OFF and by a further load impedance value.

12. The transceiver according to claim 11, wherein the further load impedance value is different from the nominal load impedance value.

13. The transceiver according to claim 10, wherein the detected leaving event is a pre-disconnection message issued or received by the transceiver whereby preliminary steps are to be taken before the communication path is effectively torn down.

14. An access node comprising:
the transceiver according to claim 10.

15. The access node according to claim 14, wherein the access node is a Digital Subscriber Line Access Multiplexer (DSLAM).

16. A Customer Premises Equipment (CPE) comprising:
the transceiver according to claim 10.

17. The CPE according to claim 16, wherein the CPE is a Digital Subscriber Line DSL gateway.

18. The transceiver according to claim 10, wherein the first symbol positions are interleaved with the second symbol positions.

19. The transceiver according to claim 10, wherein the leaving event is not performed until the pre-disconnection phase is completed.

20. The transceiver according to claim 10, wherein the crosstalk characterization includes characterizing crosstalk of all active communication lines of the vectoring group.

* * * * *